US007012422B2

(12) United States Patent
Matsuura et al.

(10) Patent No.: US 7,012,422 B2
(45) Date of Patent: Mar. 14, 2006

(54) NON-CONTACT TYPE POSITION SENSOR

(75) Inventors: Akira Matsuura, Osaka (JP); Yasunori Matsukawa, Fukui (JP); Shinjiro Ueda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 42 days.

(21) Appl. No.: 10/480,745

(22) PCT Filed: Jun. 18, 2002

(86) PCT No.: PCT/JP02/06078

§ 371 (c)(1),
(2), (4) Date: Apr. 6, 2004

(87) PCT Pub. No.: WO02/103295

PCT Pub. Date: Dec. 27, 2002

(65) Prior Publication Data

US 2004/0155648 A1    Aug. 12, 2004

(30) Foreign Application Priority Data

Jun. 19, 2001    (JP)    ............................. 2001-184502

(51) Int. Cl.
   *G01B 7/30*    (2006.01)
(52) U.S. Cl. .............................. 324/207.25; 324/207.15
(58) Field of Classification Search ........... 324/207.25, 324/207.2, 207.21, 207.22, 207.23, 207.24; 338/32 R, 32 H
See application file for complete search history.

(56) References Cited

U.S. PATENT DOCUMENTS 4,217,512 A    8/1980   Hauler et al.
5,148,106 A *  9/1992   Ozawa ................. 324/207.21
5,600,238 A    2/1997   Holloway et al.
6,753,680 B1 * 6/2004   Wolf ...................... 324/207.2

FOREIGN PATENT DOCUMENTS

EP    1 152 222 A    11/2001
JP    61-045905 A    3/1986

(Continued)

OTHER PUBLICATIONS

Japanese Internatioanl Search Report for PCT/JP02/06078, dated Jun. 18, 2002.

(Continued)

*Primary Examiner*—Bot Ledynh
*Assistant Examiner*—Reena Aurora
(74) *Attorney, Agent, or Firm*—RatnerPrestia

(57) ABSTRACT

A non-contact type position sensor enhanced in characteristics. A first magnetic element has a first magnetic detecting part at one end side thereof. A first magnet has one pole thereof fixed to the other side of the first magnetic element. A second magnetic element is positioned underneath the first magnetic element, and has a second magnetic detecting part at one end side thereof, and has the other pole of the first magnet at the other end side thereof. A third magnetic element is positioned substantially on circles concentric with the first magnetic element, and has a third magnetic detecting part at the one end side thereof. A second magnet has one pole fixed to the other end side of the third magnetic element. A fourth magnetic element is positioned underneath the third magnetic element, and has a fourth magnetic detecting part at one end side thereof, and also has the other pole of the second magnet at the other end side thereof. A magnetic detecting element is positioned between the first and second magnetic detecting parts, and is positioned between the third and fourth magnetic detecting parts.

8 Claims, 7 Drawing Sheets

FOREIGN PATENT DOCUMENTS

| | | |
|---|---|---|
| JP | 02-110815 | 9/1990 |
| JP | 02-240585 A | 9/1990 |
| JP | 10-122810 A | 5/1998 |
| WO | WO 92/11510 A | 7/1992 |

OTHER PUBLICATIONS

European Search Report for EP 02 73 8755, dated Nov. 24, 2004.

* cited by examiner

NON-CONTACT TYPE POSITION SENSOR

This application is a U.S. National Phase Application of PCT International Application PCT/JP02/06078.

TECHNICAL FIELD

The present invention relates to a non-contact type position sensor for detecting a rotational angle or position of an object by changes in magnetism.

BACKGROUND ART

A conventional non-contact type position sensor of this type is disclosed, for example, in Japanese Laid-open Patent No. H2-240585.

The conventional non-contact type position sensor is described hereinafter by referring to the drawings.

FIG. 6 is a perspective exploded view of the conventional non-contact type position sensor. FIG. 7 is a side sectional view of the conventional non-contact type position sensor. The non-contact type position sensor is used, for example, for detection of a crank angle in an ignition timing control device of an internal-combustion engine.

In FIG. 6 and FIG. 7, magnet 1 has N pole and S pole. First magnetic element 2 has magnet 1 fixed thereon and has one end 2A bent to project upward to magnet 1 side. Second magnetic element 3 of an inverted L-shape has one end 3A bent in one direction. This one end 3A is disposed at a position facing one end 2A of first magnetic element 2.

Magnetic detecting element 4 is disposed at a position facing magnet 1 at the side of second magnetic element 3. Case 5 made of resin accommodates magnet 1, first magnetic element 2, second magnetic element 3, and magnetic detecting element 4 in the inside thereof, and has opening 5A. Case 5 also has connector 6. Connector 6 has an integrally formed connector terminal 7. Connector element 7 has one end in the inside of case 5, and the other end projecting outward. One end of connector terminal 7 in case 5 is electrically connected to lead terminal 8 lead out from magnetic detecting element 4. Lid 9 made of resin closes opening 5A of case 5.

In the conventional non-contact type position sensor having a configuration above-explained, the operation thereof is described below.

In the conventional non-contact type position sensor described above, one end 2A of first magnetic element 2 and one end 3A of second magnetic element 3 face each other across a gap. Magnet 1 and magnetic detecting element 4 are also facing each other across a gap.

Magnetic flux shutter 10B as shown in FIG. 8A and FIG. 8B is inserted into this gap. Magnetic flux shutter 10B is mounted on rotary shaft 10A of the object in the vertical direction, and rotates together with rotary shaft 10A of the object. As magnetic flux shutter 10B moves in the radial direction, the magnetic flux density of magnet 1 reaching magnetic detecting element 4 changes. Magnetic detecting element 4 outputs this change of the magnetic flux density as an output signal. This output signal is input into a computer or the like (not shown) by way of lead terminal 8 and connector terminal 7 in connector 6. Thus, the rotational angle of rotary shaft 10A of the object is detected.

In the conventional configuration above-explained, magnetic flux shutter 10B rotates while being inserted between magnet 1 and magnetic detecting element 4. Therefore, in magnetic force shutter 10B, an electromagnetic induction is caused by the magnetic flux of magnet 1. As a result, as shown in FIG. 8A, when magnetic flux shutter 10B rotates in an positive direction, magnetic force shutter 10B appears to be magnetically charged as the N pole. To the contrary, when magnetic force shutter 10B rotates in the reverse direction, as shown in FIG. 8B, magnetic force shutter 10B appears to be magnetically charged as the S pole. Accordingly, depending on the rotating direction of the magnetic force shutter 10B, the magnetic flux applied to magnetic detecting element 4 varies. Therefore, the output varies between the normal rotation and reverse rotation of rotary shaft 10A of the object. Hence, hysteresis occurs in the output characteristic of the non-contact type position sensor.

SUMMERY OF THE INVENTION

It is hence an object of the invention to present a non-contact type position sensor enhanced in characteristics free from hysteresis in output signal regardless of the normal rotation or reverse rotation of rotary shaft of the object.

In this non-contact type position sensor, a first magnetic element has a first magnetic detecting part at one end side thereof. A first magnet has one pole fixed to the other side of the first magnetic element. A second magnetic element is positioned underneath the first magnetic element, and has a second magnetic detecting part at one end side thereof, and has the other pole of the first magnet fixed at the other end side thereof. A third magnetic element is positioned substantially on circles concentric with the first magnetic element, and has a third magnetic detecting part at one end side thereof. A second magnet has one pole fixed to the other end side of the third magnetic element. A fourth magnetic element is positioned underneath the third magnetic element, and has a fourth magnetic detecting part at one end side thereof, and also has the other pole of the second magnet at the other end side thereof. A magnetic detecting element is positioned between the first magnetic detecting part and the second magnetic detecting part, and between the third magnetic detecting part and the fourth magnetic detecting part.

In this configuration, the magnetic flux generated by electromagnetic induction caused in the rotary shaft of the object does not act directly on the magnetic detecting element. As a result, the output of the magnetic detecting element is not changed between the normal rotation and reverse rotation of the rotary shaft of the object. Thus, the non-contact type position sensor free from hysteresis in the output characteristics is obtained.

DETAILED DESCRIPTION OF PREFERRED EMBODIMENT

A non-contact type position sensor in a preferred embodiment of the invention is described hereinafter while referring to the accompanying drawings.

Figure 1:
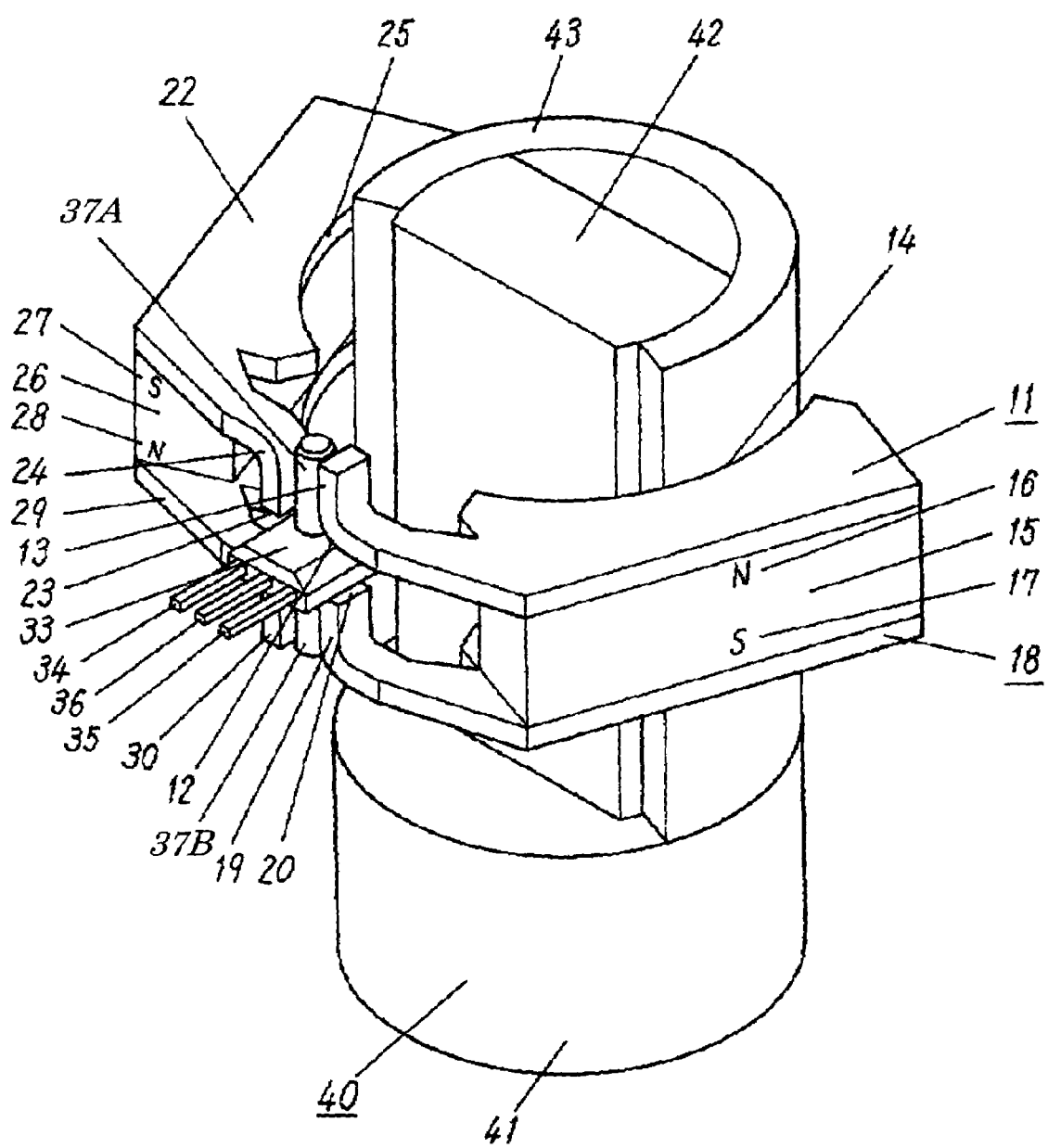
FIG. 1 is a perspective view showing a state in which the rotary shaft of the object is disposed with a non-contact type position sensor in a preferred embodiment of the invention and the case of the sensor is removed.
Figure 2:
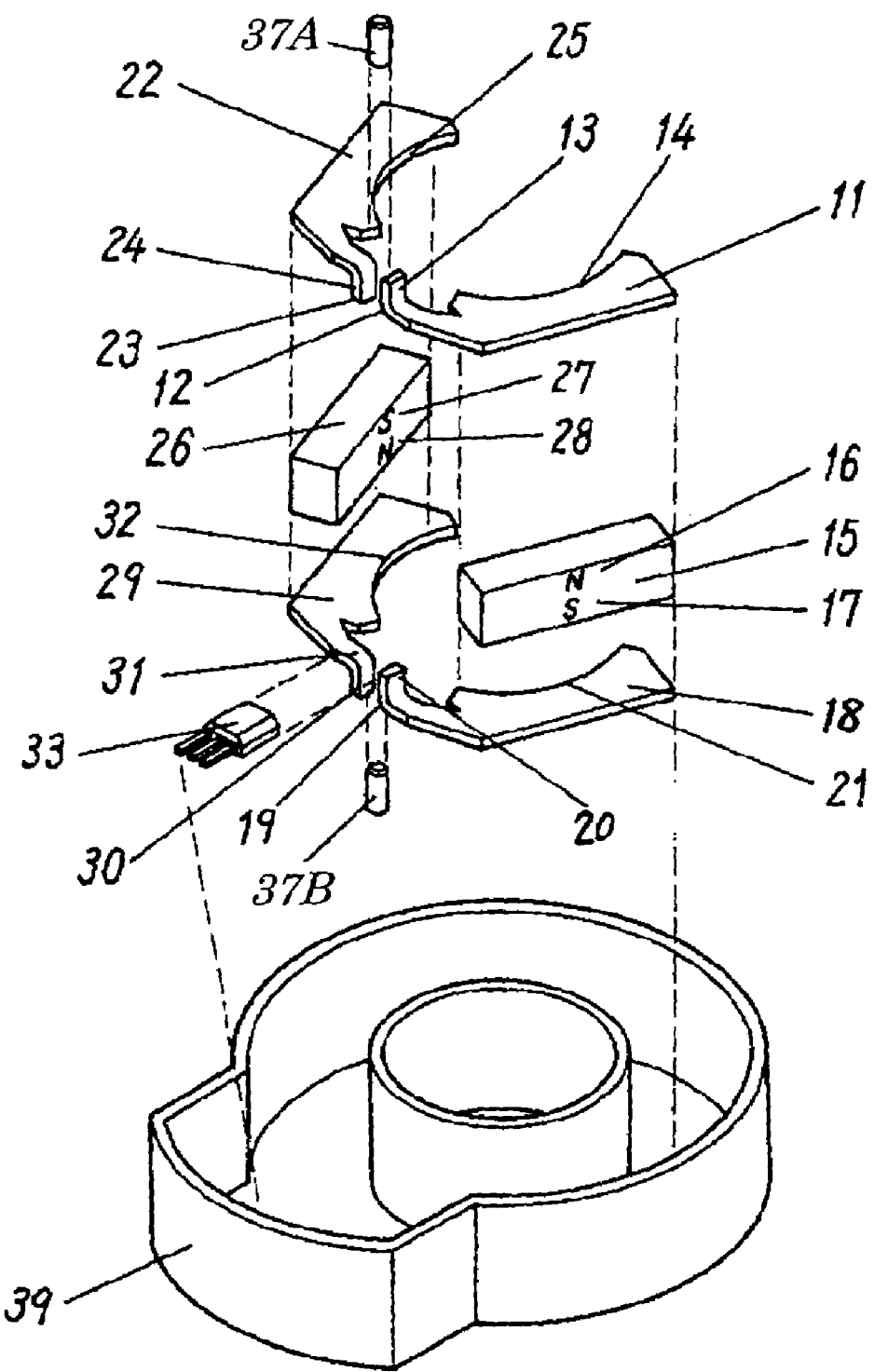
FIG. 2 is a perspective exploded view showing a state in which the case is removed in the non-contact type position sensor in the preferred embodiment.
Figure 3:
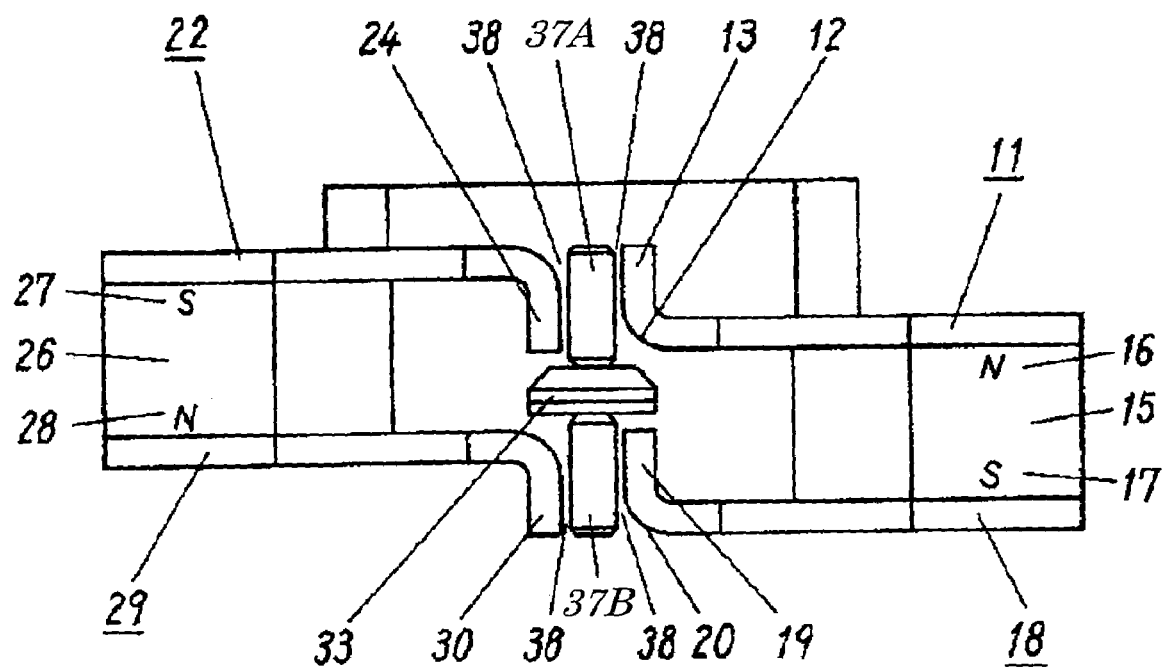
FIG. 3 is a side view showing a state in which the case is removed in the non-contact type position sensor.

FIG. 1 is a perspective view showing a state in which the rotary shaft of the object is disposed with a non-contact type position sensor in a preferred embodiment of the invention and the case of the sensor is removed. FIG. 2 is a perspective exploded view of this non-contact type position sensor. FIG. 3 is a side view showing a state in which the case of the non-contact type position sensor is removed.

In FIG. 1 to FIG. 3, first magnetic element 11 made of metal has first magnetic detecting part 12 on a lower surface of one end side thereof. This one end side is bent to form upper side bent part 13. The other end side extends outward.

First magnetic element 11 also has arcuate part 14 at the inner side of the other end side thereof. First magnet 15 is a magnet mainly made of, for example, SmCo. First magnet 15 has N pole 16 fixed on a lower surface of the other end side of first magnetic element 11, and has S pole 17 at lower side thereof.

Second magnetic element 18 is made of metal, and is positioned underneath first magnetic element 11. The one end side is bent upward to form a lower side bent part 19. A second magnetic detecting part 20 is disposed on the upper surface of this lower side bent part 19. S pole 17 of first magnet 15 is fixed on the upper surface of the other end side of second magnetic element 18. The inner side of the other end side has arcuate part 21.

Third magnetic element 22 made of metal has third magnetic detecting part 23 at the lower surface of one end side thereof. This one end side is bent to form upper side bent part 24. The other end side extends outward.

Third magnetic element 22 also has arcuate part 25 at the inner side of the other end side thereof. Second magnet 26 is a magnet mainly made of, for example, SmCo. Second magnet 26 has S pole 27 fixed at the lower surface of the other end side of third magnetic element 22, and N pole 28 at the lower side thereof.

Fourth magnetic element 29 made of metal is positioned underneath third magnetic element 22. The one end side is bent downward to form a lower side bent part 30. Fourth magnetic detecting part 31 is disposed on the upper surface of this lower side bent part 30. N pole 28 of second magnet 26 is fixed on the upper surface of the other end side of fourth magnetic element 29. The inner side of the other end side has arcuate part 32.

First magnetic element 11 and third magnetic element 22 are positioned so that the distance between their one end sides is shorter than the distance between the other end sides of them. Second magnetic element 18 and fourth magnetic element 29 are positioned similarly so that the distance between their one end sides is shorter than the distance between the other end sides of them.

First magnetic element and third magnetic element are positioned substantially on a plurality of concentric circles centered on the center of the rotary shaft of the object.

Magnetic detecting element 33 is, for example, a Hall IC, and is positioned between first magnetic detecting part 12 and second magnetic detecting part 20, and between the third magnetic detecting part 23 and fourth magnetic detecting part 31. Magnetic detecting element 33 extends sideward, and has power source terminal 34, GND terminal 35, and output terminal 36.

First magnetic concentration piece 37A is made of a magnetic material. As shown in FIG. 3, first magnetic concentration piece 37A is positioned between first upper side bent part 13 at one end side of first magnetic element 11 and second upper side bent part 24 at one end side of third magnetic element 22, and forms gap 38. Upper side bent part 13 and upper side bent part 24 are disposed along the side face from the upper end to the lower end of first magnetic concentration piece 37A.

First magnetic concentration piece 37A projects downward from the lower ends of the first magnetic detecting part 12 and third magnetic detecting part 23.

Second magnetic concentration piece 37B is made of a magnetic material. Second magnetic concentration piece 37B is positioned between first lower side bent part 19 at one end side of second magnetic element 18 and second lower side bent part 30 at one end side of fourth magnetic element 29, and forms gap 38. First lower side bent part 19 and second lower side bent part 30 are disposed along the side face from the upper end to the lower end of second magnetic concentration piece 37B.

In this way, gap 38 is formed between each one of first magnetic element 11 and third magnetic element 22, and first magnetic concentration piece 37A. Further, gap 38 is formed between each one of second magnetic element 18 and fourth magnetic element 29, and second magnetic concentration piece 37B. Therefore, the magnetic flux does not flow from first magnet 15 to third magnetic element 22 by way of first magnetic element 11 and first magnetic concentration piece 37A.

At the same time, the magnetic flux does not flow from second magnet 26 to second magnetic element 18 by way of fourth magnetic element 29 and second magnetic concentration piece 37B.

As a result, the magnetic flux generated by magnet 15 and magnet 26 are concentrated into magnetic detecting element 33. Hence, the output sensitivity of the non-contact type position sensor is enhanced.

First upper side bent part 13 and second upper side bent part 24 are close to the side face of first magnetic concentrating piece 37A from the upper end to lower end thereof. Therefore, in first magnetic element 11 and third magnetic element 22, the area close to first magnetic concentrating piece 37A is increased.

Further, first lower side bent part 19 and second lower side bent part 30 are close to the side face of second magnetic concentrating piece 37B from the upper end to lower end thereof. Therefore, in second magnetic element 18 and fourth magnetic element 29, the area close to second magnetic concentrating piece 37B is increased.

As a result, the amount of magnetic flux flowing out into the space from first magnetic element 11, second magnetic element 18, third magnetic element 22, and fourth magnetic element 29 is decreased. Therefore, the magnetic flux are concentrated into magnetic detecting element 33. Hence, the sensitivity of the non-contact type position sensor is enhanced.

Second magnetic concentrating piece 37B projects upward from the upper ends of second magnetic detecting part 20 at one end side of the second magnetic element 18 and fourth magnetic detecting part 31 in fourth magnetic element 29.

First magnetic concentrating piece 37A is positioned between the one end side of first magnetic element 11 and one end side of third magnetic element 22, and projects downward. The leading end of first magnetic concentrating piece 37A is close to the upper surface of magnetic detecting element 33.

Further, second magnetic concentrating piece 37B is positioned between the one end side of second magnetic element 18 and one end side of fourth magnetic element 29, and projects upward. The leading end of second magnetic concentrating piece 37B is close to the lower side of magnetic detecting element 33.

Consequently, the magnetic flux transmitted from first magnet 15 by way of first magnetic element 11 is concentrated into a magnetic sensing part (not shown) of magnetic detecting element 33 by first magnetic concentrating piece 37B. The magnetic flux transmitted from second magnet 26 by way of fourth magnetic element 29 is concentrated into a magnetic sensing part (not shown) of magnetic detecting element 33 by second magnetic concentrating piece 37B.

Hence, the sensitivity of the non-contact type position sensor is enhanced.

Magnetic detecting element 33 is held between the lower surface of first magnetic concentrating piece 37A and the upper surface of second magnetic concentrating piece 37B.

Accordingly, from first magnetic concentrating piece 37A and second magnetic concentrating piece 37B, the magnetic flux directly flow into magnetic detecting element 33. Thus, the magnetic flux are further concentrated into magnetic detecting element 33. Hence, the sensitivity of the non-contact type position sensor is further enhanced.

Case 39 accommodates and supports first magnetic element 11, first magnet 15, second magnetic element 18, third magnetic element 22, second magnet 26, fourth magnetic element 29, first magnetic concentrating piece 37A, second magnetic concentrating piece 37B, and magnetic detecting element 33, in the inside thereof. Rotary shaft 40 of the object is disposed so that the outer circumference thereof is along the inner circumference side of arcuate part 14 of first magnetic element 11, arcuate part 21 of second magnetic element 18, arcuate part 25 of third magnetic element 22, and arcuate part 32 of fourth magnetic element 29.

First magnetic element 11 and third magnetic element 22 are positioned so that the distance between their one end sides is shorter than the distance between the other end sides of them. Second magnetic element 18 and fourth magnetic element 29 are positioned similarly so that the distance between their one end sides is shorter than the distance between the other end sides of them. Therefore, the overall dimension summing up the rotary shaft 40 of the object, first magnetic element 11, and third magnetic element 22 is smaller than the total dimension of the outside diameter of rotary shaft 40 of the object, and the widths of first magnetic element 11 and third magnetic element 22.

As a result, a small-sized non-contact type position sensor is presented.

Arcuate part 14 is provided in first magnetic element 11, arcuate part 21 is provided in second magnetic element 18, arcuate part 25 is provided in third magnetic element 22, and arcuate part 32 is provided in fourth magnetic element 29. Rotary shaft 40 of the object is along each of the arcuate parts. Accordingly, the gap between rotary shaft 40 of the object and each one of first magnetic element 11, second magnetic element 18, third magnetic element 22, and fourth magnetic element 29, becomes smaller.

As a result, the magnetic flux flowing from first magnet 15 and returning to first magnet 11 by way of first magnetic element 11, rotary shaft 40 and second magnetic element 18 is not attenuated by the gap. Similarly, the magnetic flux flowing from second magnet 26 and returning to second magnet 26 by way of fourth magnetic element 29, opposite side rotary shaft 40 and third magnetic element 22 is not attenuated by the gap. Therefore, the rotation of rotary shaft 40 of the object can be detected at high precision.

As a result, the rotation of the object can be detected at high precision, so that the non-contact type position sensor enhanced in the output precision is obtained.

Rotary shaft 40 of the object is composed of circular column part 41, insertion part 42 projecting upward from this circular column part 41, and fitting part 43 fitted into this insertion part 42.

Further, the other end side of first magnetic element 11 and the other end side of third magnetic element 22 are disposed on different planes. The other end side of second magnetic element 18 and the other end side of fourth magnetic element 29 are disposed on different planes. First magnet 15 and second magnet 26 are disposed on different planes.

Accordingly, magnetic flux does not flow from N pole 16 in first magnet 15 directly into S pole 27 in second magnet 26 through the air. Similarly, the magnetic flux does not flow from N pole 28 in second magnet 26 directly into S pole 17 in first magnet 15 through the air. Therefore, the magnetic flux passing magnetic detecting element 33 increases, and the output of the non-contact type position sensor becomes larger.

In the non-contact type position sensor in the preferred embodiment of the invention structured above-explained, the assembling method is described below.

First, one end side of first magnetic element 11 is bent upward to form first upper side bent part 13. A first magnetic detecting part 12 is formed at the lower surface of this first upper side bent part 13. At other end side in first magnetic element 11, N pole 16 in first magnet 15 is fixed by adhesive.

Next, one end side of second magnetic element 18 is bent to form first lower side bent part 19 and second magnetic detecting part 20. At the other end side of second magnetic element 18, S pole 17 of first magnet 15 is fixed by adhesive. First magnetic element 11, first magnet 15, and second magnetic element 18 are supported and accommodated in the inside of case 39.

Next, magnetic detecting element 33 is held between the lower side of first magnetic concentrating piece 37A and second magnetic concentrating piece 37B. After that, first magnetic concentrating element 37A, second magnetic concentrating element 37B and magnetic detecting element 33 are accommodated in the inside of case 39.

Next, one end side of third magnetic element 22 is bent downward, so that second upper side bent part 24 and third magnetic detecting part 23 are formed. At the other end side of third magnetic element 22, S pole 27 of second magnet 26 is fixed by adhesive.

Then, one end side of fourth magnetic element 29 is bent, so that second lower side bent part 30 and fourth magnetic detecting part 31 are formed. At the other end side of this fourth magnetic element 31, N pole 28 of second magnet 26 is fixed by adhesive. Then, third magnetic element 22, second magnet 26, and fourth magnetic element 29 are supported and accommodated in the inside of case 39.

In the non-contact type position sensor in the preferred embodiment of the invention structured above-explained and thus assembled, the operation is described hereinafter while referring to FIG. 4A, B, C and FIG. 5.

A power source (not shown) is connected to power source terminal 34 of magnetic detecting element 33, and ground (GND) terminal 35 is connected to ground (GND) (not shown). Insertion part 42 of rotary shaft 40 of the object and fitting part 43 of rotary shaft 40 are disposed so as to be placed along the inner circumferential side of each one of arcuate part 14 of first magnetic element 11, arcuate part 21 of second magnetic element 18, arcuate part 25 of third magnetic element 22, and arcuate part 32 of fourth magnetic element 29. In this state, rotary shaft 40 of the object rotates.

Figure 4A:
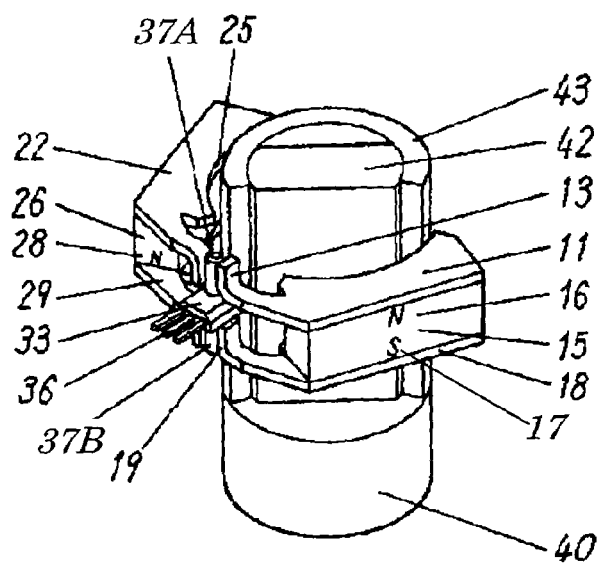
FIGS. 4A, B, C are perspective views showing operating states of a non-contact type position sensor in a preferred embodiment of the invention.

First, as shown in FIG. 4A, when the rotational angle of rotary shaft 40 of the object is −45°, fitting part 43 faces and is along the inner circumferential side of tarcuate part 25 of third magnetic element 22 and arcuate part 32 of fourth magnetic element 29. At this time, insertion part 42 faces the side of first magnetic element 11 and second magnetic element 18. A gap is provided between insertion part 42 and first magnetic element 11 and second magnetic element 18. At this time, the magnetic flux generated from N pole 28 of econd magnet 26 returns to S pole 27 of second magnet 26 by way of the other end side of fourth magnetic element 29, fitting part 43 of opposite side rotary shaft 40, and third magnetic element 22.

The magnetic flux generated from N pole 16 of first magnet 15 returns to first magnet 15 by way of the other end side of first magnetic element 11, first upper side bent part 13 of first magnetic element 11, first magnetic concentrating piece 37A, magnetic detecting element 33, second magnetic concentrating piece 37B, first lower side bent part 19 of second magnetic element 18, and the other end side of second magnetic element 18. At this time, the magnetic flux flows through magnetic detecting element 33 from the upper side to the lower side thereof. Thus, the output voltage from output terminal 36 of magnetic detecting element 33 is about 0.7 V as indicated by point 102 in FIG. 5.

Figure 4B:
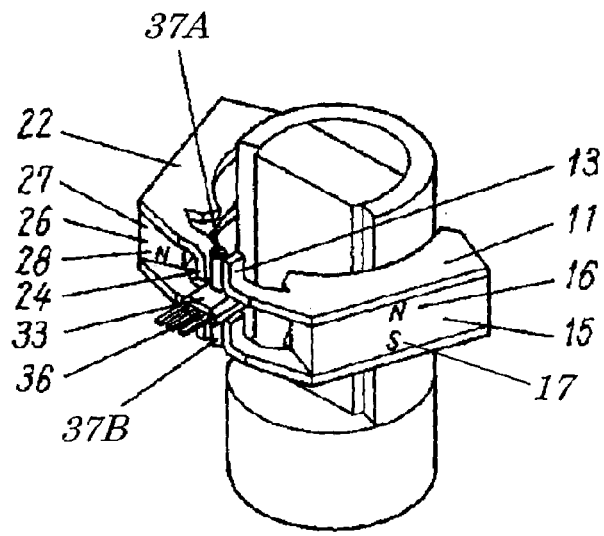

As shown in FIG. 4B, when the rotational angle of rotary shaft 40 of the object is zero (0) degree, the magnetic flux generated from N pole 16 of first magnet 15 returns to S pole 17 in the following route. That is, this magnetic flux returns to S pole 17 of first magnet 15 by way of the other end side of first magnetic element 11, first upper side bent part 13 of first magnetic element 11, first magnetic concentrating piece 37A, magnetic detecting element 33, second magnetic concentrating piece 37B, first lower side bent part 19 of second magnetic element 18, and the other end side of second magnetic element 18.

The magnetic flux generated from N pole 28 of second magnet 26 returns to S pole 27 in the following route. That is, the magnetic flux returns to S pole 27 of second magnet 26 by way of the other end side of fourth magnetic element 29, second lower side bent part 30 of fourth magnetic element 29, second magnetic concentrating piece 37B, magnetic detecting element 33, first magnetic concentrating piece 37A, second upside folded part 24 of third magnetic element 22, and the other end side of third magnetic element 22.

Herein, the quantity of magnetic flux generated from first magnet 15 and passing magnetic detecting element 33 from the upper side to the lower side thereof is nearly equal to the quantity of magnetic flux generated from N pole 28 of second magnet 26 and passing magnetic detecting element 33 from the lower side to the upper side thereof. As a result, the quantity of magnetic flux passing magnetic detecting element 33 is nearly zero. Therefore, the output voltage from output terminal 36 in magnetic detecting element 33 is about 2.5 V as indicated by point 104 in FIG. 5.

Figure 4C:
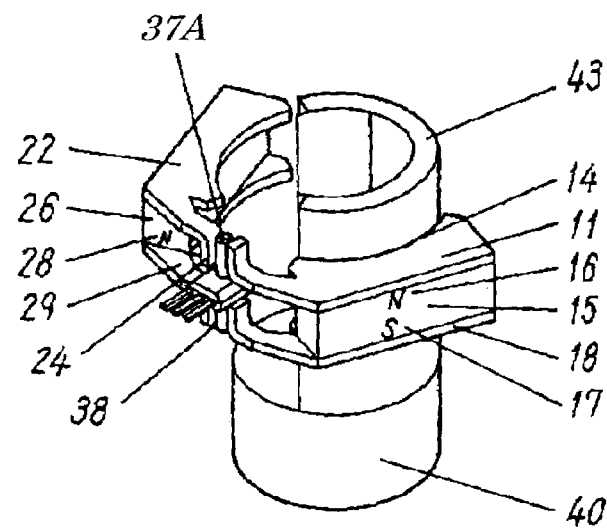

Next, as shown in FIG. 4C, when the rotational angle of rotary shaft 40 of the object is 45, fitting part 43 is positioned so that the part is along the inner circumferential side of arcuate part 14 of first magnetic element 11 and arcuate part 21 of second magnetic element 18. At this time, insertion part 42 is positioned at the side of third magnetic element 22 and fourth magnetic element 29. A gap is provided between insertion part 42 and third magnetic element 22, and between part 42 and fourth magnetic element 29.

At this time, the magnetic flux generated from N pole 16 of first magnet 15 returns to S pole 17 of first magnet 15 by way of the other end side of first magnetic element 11, fitting part 43 and second magnetic element 18.

The magnetic flux generated from N pole 28 of second magnet 26 returns to second magnet 26 by way of the other end side of fourth magnetic element 29, second lower side bent part 30 of fourth magnetic element 29, second magnetic concentrating piece 37B, magnetic detecting element 33, first magnetic concentrating piece 37A, second upper side bent part 24 of third magnetic element 22, and other end side of third magnetic element 22. Therefore, the magnetic flux flows from the lower side to the upper side of magnetic detecting element 33.

Figure 5:
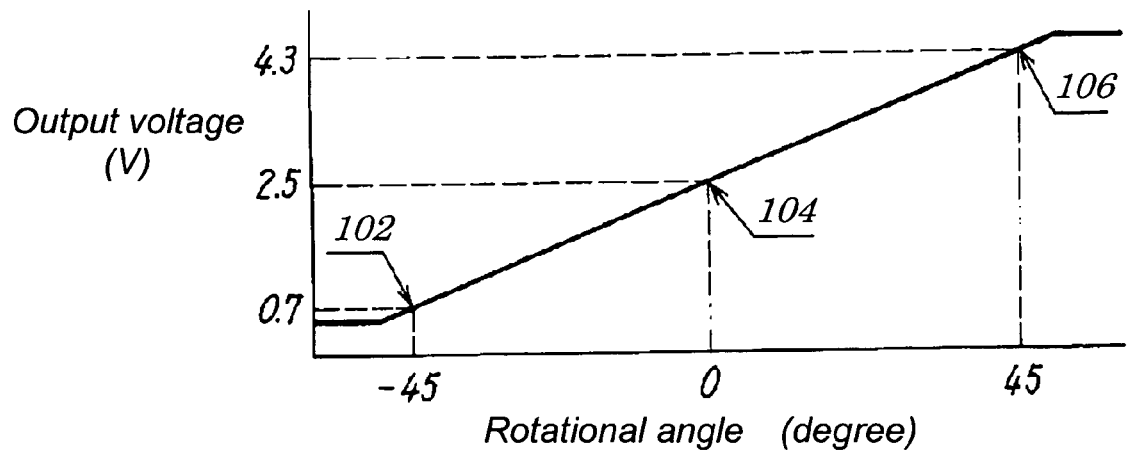
FIG. 5 shows output characteristics of a non-contact type position sensor in a preferred embodiment of the invention.
Figure 6:
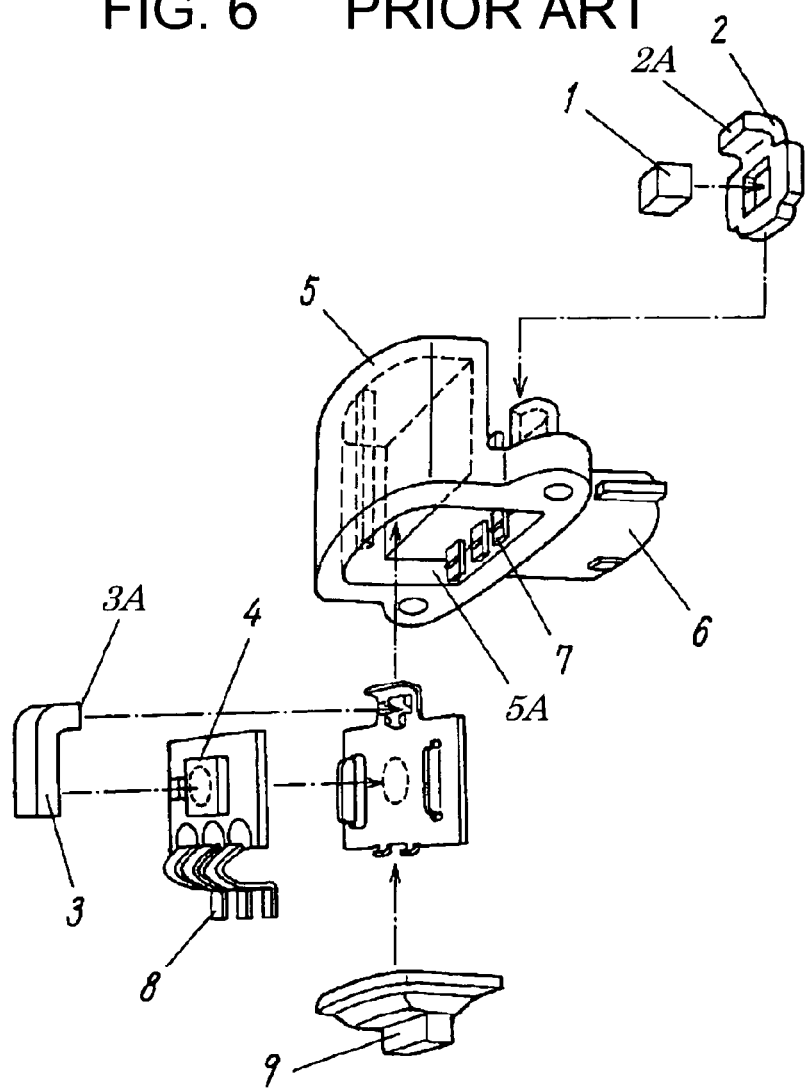
FIG. 6 is a perspective exploded view of a conventional non-contact type position sensor.
Figure 7:
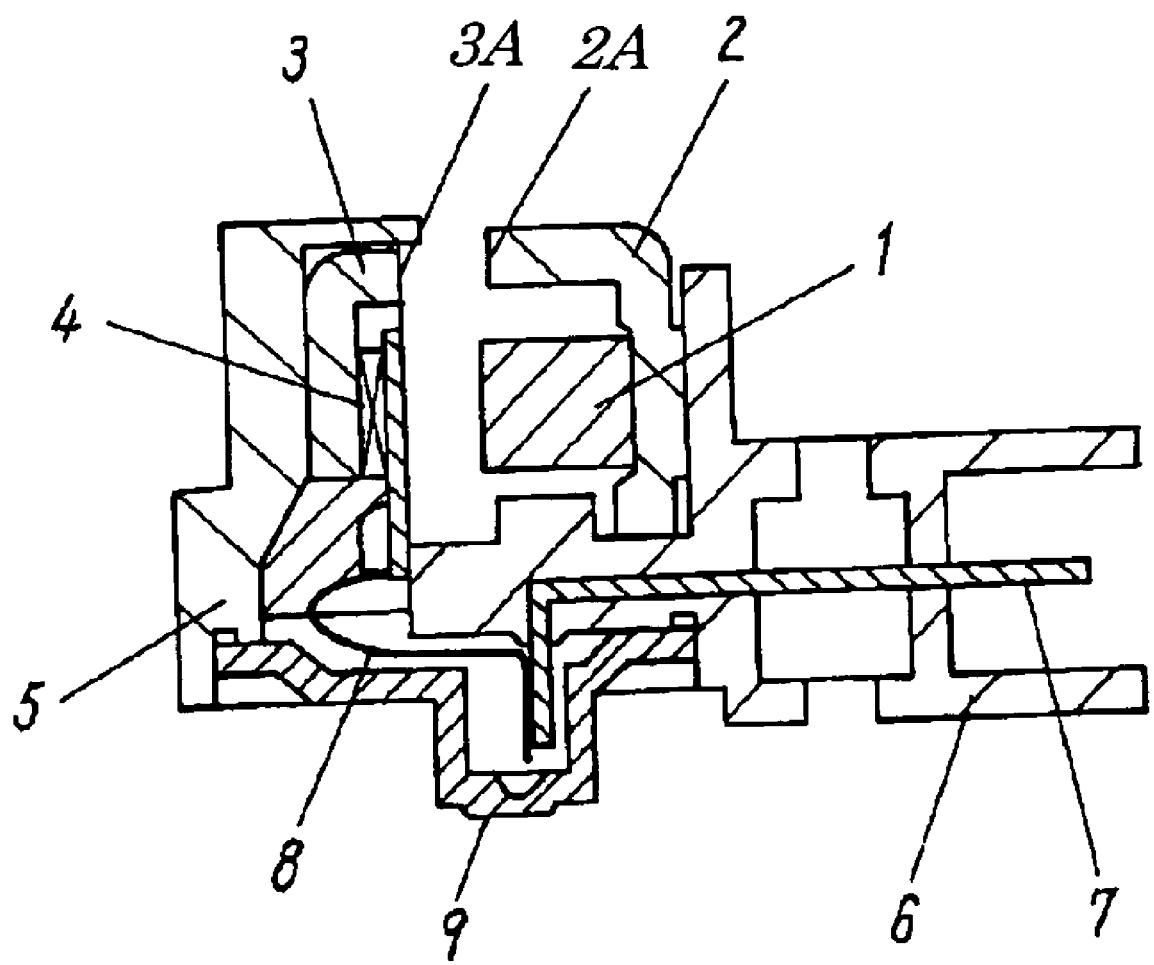
FIG. 7 is a side view of the conventional non-contact type position sensor.
Figure 8A:
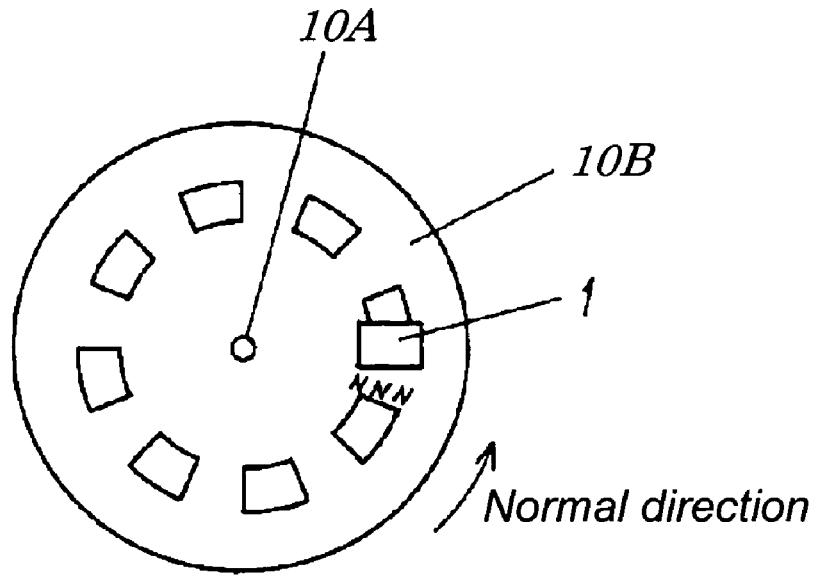
FIGS. 8A, B show states of generation of magnetic flux by electromagnetic induction in a magnetic flux shutter disposed in the conventional non-contact type position sensor.
Figure 8B:
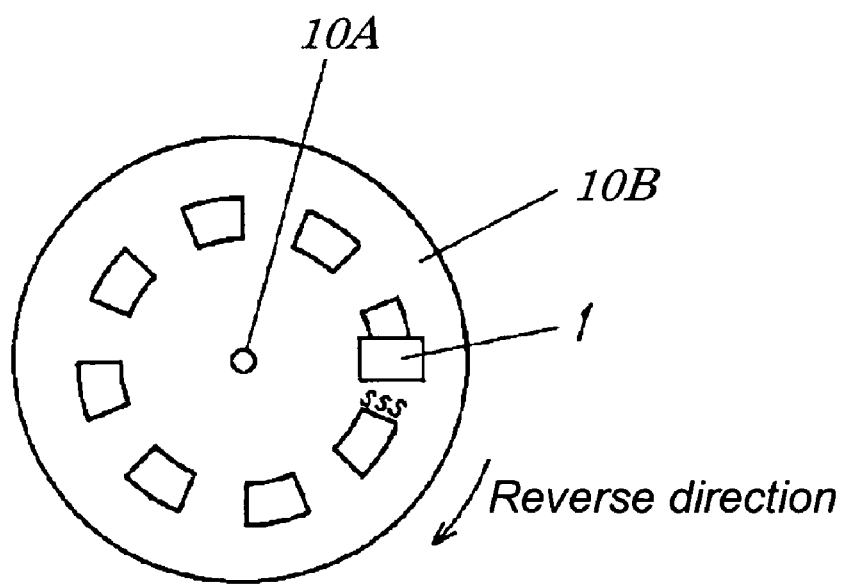

Thus, the output voltage from output terminal 36 of magnetic detecting element 33 is about 4.3 V as indicated by point 106 in FIG. 5.

Therefore, along with the rotation motion of rotary shaft 40 of the object, as shown in FIG. 5, an output signal depending on the position is output from output terminal 36 in magnetic detecting element 33. Receiving this output signal, the computer (not shown) detects the position of rotary shaft 40.

Suppose a case that magnetic force is generated by electromagnetic induction in fitting part 43 of rotary shaft 40 as fitting part 43 of rotary shaft 40 of the object passes near first magnetic element 11, second magnetic element 18, third magnetic element 22, and fourth magnetic element 29.

In the non-contact type position sensor in a preferred embodiment of the invention, first magnetic detecting part 12 is disposed at the lower side of one end side of magnetic element 11. The other end side of first magnetic element 11 extends outward. First magnet 15 has N pole 16 thereof fixed at the lower surface of the other end side of first magnetic element 11.

Second magnetic element 18 is positioned underneath first magnetic element 11, and has second magnetic detecting part 20 on the upper side of the one end side thereof. At the other end side, S pole 17 of first magnet 15 is fixed. Magnetic detecting element 33 is positioned between first magnetic detecting part 12 of first magnetic element 11 and second magnetic detecting part 20 of second magnetic element 18.

Accordingly, the loop of the magnetic flux starts from N pole 16 of first magnet 15 and returns to S pole 17 of first magnet 15 by way of the other end side of first magnetic element 11, first magnetic detecting part 12, magnetic detecting element 33, second magnetic detecting part 20, and the other end side of second magnetic element 18. As a result, in rotary shaft 40, the magnetic flux generated by electromagnetic induction does not act directly on magnetic detecting element 33. Therefore, the output of the magnetic detecting element is not changed between when rotary shaft 40 rotates in the normal direction and when rotary shaft 40 rotates in the reverse direction.

As a result, hysteresis does not occur in the output characteristic of the non-contact type position sensor. Therefore, the non-contact type position sensor enhanced in output characteristics is presented.

INDUSTRIAL APPLICABILITY

According to the invention, as above-described, the magnetic flux generated by electromagnetic induction caused in the rotary shaft of the object does not act directly on the magnetic detecting element. Therefore, the output is not changed between when the rotary shaft of the object rotates in the normal direction and when the rotary shaft rotates in the reverse direction. As a result, hysteresis does not occur in the output characteristic of the non-contact type position sensor. Therefore, the non-contact type position sensor enhanced in output characteristics is presented.

What is claimed is:

1. A non-contact type position sensor comprising:
   (a) a first magnetic element having a first magnetic detecting part at one end side thereof,
   (b) a first magnet having one pole fixed at an other end side of the first magnetic element,
   (c) a second magnetic element positioned underneath the first magnetic element, having a second magnetic detecting part at one end side thereof, and having an other pole than the one pole of the first magnet at an other end side thereof,
   (d) a third magnetic element positioned substantially on circles concentric with the first magnetic element, and having a third magnetic detecting part at one end side thereof,
   (e) a second magnet having a pole of opposite polarity to polarity of the one pole of the first magnet, fixed at an other end side of the third magnetic element,
   (f) a fourth magnetic element positioned underneath the third magnetic element, having a fourth magnetic detecting part at one end side thereof, and having an other pole than the pole of the second magnet at an other end side thereof, and
   (g) a magnetic detecting element positioned such that the first and second magnetic detecting parts are on one side of said magnetic detecting element and the third and fourth magnetic detecting parts are on the other side of said magnetic detecting element.

2. The non-contact type position sensor of claim 1, wherein a distance between each of the one end sides of the first magnetic element and the one end side of the third magnetic element is shorter than a distance between each of the other end sides of the first and second magnetic elements, and
a distance between each of the one end sides of the second magnetic element and the fourth magnetic element is shorter than a distance between each of the other end sides of the second and fourth magnetic elements.

3. The non-contact type position sensor of claim 1, further comprising:

a first magnetic concentrating piece positioned between the one end side of the first magnetic element and the one end side of the third magnetic element, having a leading end thereof close to an upper surface of the magnetic detecting element, and a second magnetic concentrating piece positioned between the one end side of the second magnetic element and the one end side of the fourth magnetic element, having a leading end thereof close to a lower side of the magnetic detecting element.

4. The non-contact type position sensor of claim 3,
wherein the first magnetic concentrating piece has a gap between the first magnetic element and the third magnetic element, and
the second magnetic concentrating piece has a gap between the second magnetic element and the fourth magnetic element.

5. The non-contact type position sensor of claim 3,
wherein an upper side bent part is formed by bending the one end side of the first magnetic element, and another upper side bent part is formed by bending the one end side of the third magnetic element,
the upper side bent part and the another upper side bent part are disposed at positions being along from an upper end to a lower end of the first magnetic concentration piece,
a lower side bent part is formed by bending the one end side of the second magnetic element, and another lower side bent part is formed by bending the one end side of the fourth magnetic element, and
the lower side bent part and the another lower side bent part are disposed at positions being along from the upper end to the lower end of the second magnetic concentration piece.

6. The non-contact type position sensor of claim 3,
wherein the magnetic detecting element is held by a lower side of the first magnetic concentrating piece and an upper side of the second magnetic concentrating piece.

7. The non-contact type position sensor of claim 1,
wherein an inner side of the other end side of each of the first magnetic element, the second magnetic element, the third magnetic element, and the fourth magnetic element has an arcuate part, and the arcuate part is formed along a rotary shaft of an object.

8. The non-contact type position sensor of claim 1,
wherein the other end side of the first magnetic element and the other end side of the third magnetic element are formed on different planes, and
the other end side of the second magnetic element and the other end side of the fourth magnetic element are formed on different planes.

* * * * *